(12) United States Patent
Zeng Eyindanga et al.

(10) Patent No.: US 10,773,641 B2
(45) Date of Patent: Sep. 15, 2020

(54) PROCESS FOR SIGNALING AN ACCIDENT BY MEANS OF A SIGNALING DRONE

(71) Applicant: BULL SAS, Les Clayes Sous Bois (FR)

(72) Inventors: Landry Stéphane Zeng Eyindanga, Grenoble (FR); Dany Jonas Mubamu Mombo, Libreville (GA); Jonathan Formentin, Saint-Michel les Portes (FR)

(73) Assignee: BULL SAS, Le Clayes-Sous-Bois (FR)

( * ) Notice: Subject to any disclaimer, the term of this patent is extended or adjusted under 35 U.S.C. 154(b) by 0 days.

(21) Appl. No.: 16/064,019

(22) PCT Filed: Dec. 19, 2016

(86) PCT No.: PCT/EP2016/081727
§ 371 (c)(1),
(2) Date: Jun. 20, 2018

(87) PCT Pub. No.: WO2017/108681
PCT Pub. Date: Jun. 29, 2017

(65) Prior Publication Data
US 2019/0001872 A1    Jan. 3, 2019

(30) Foreign Application Priority Data

Dec. 22, 2015  (FR) ..................................... 15 63131

(51) Int. Cl.
*G08G 1/00* (2006.01)
*B60Q 1/46* (2006.01)
(Continued)

(52) U.S. Cl.
CPC .............. *B60Q 1/46* (2013.01); *B64C 39/024* (2013.01); *B64D 47/02* (2013.01); *G08G 1/04* (2013.01);
(Continued)

(58) Field of Classification Search
CPC ..... B60Q 1/46; B64C 39/024; B64C 2201/12; B64C 2201/145; B64D 47/02; G08G 1/04; G08G 1/0955; G08G 1/166
See application file for complete search history.

(56) References Cited

U.S. PATENT DOCUMENTS 6,084,510 A * 7/2000 Lemelson ............ G08B 15/004
340/539.13
9,142,127 B1    9/2015 McDevitt-Pimbley et al.
(Continued)

FOREIGN PATENT DOCUMENTS

FR    2 986 647 A3    8/2013

OTHER PUBLICATIONS

Waypoint—Setting the Scene—Using Drones for Traffic Accident Reconstruction and Analysis (Year: 2015).*
(Continued)

*Primary Examiner* — Quang Pham
(74) *Attorney, Agent, or Firm* — Pillsbury Winthrop Shaw Pittman LLP

(57) ABSTRACT

A process for signaling an accident by at least one drone, the process involving acquiring a location of the place of the accident; calculating the coordinates of at least one signaling position; signaling the accident in accordance with a combination of the location of the place of the accident and the calculated coordinates of the at least one position.

10 Claims, 2 Drawing Sheets

(51) Int. Cl.
  *B64C 39/02* (2006.01)
  *G08G 1/0955* (2006.01)
  *G08G 1/04* (2006.01)
  *B64D 47/02* (2006.01)
  *G08G 1/16* (2006.01)

(52) U.S. Cl.
  CPC ........... *G08G 1/0955* (2013.01); *G08G 1/166* (2013.01); *B64C 2201/12* (2013.01); *B64C 2201/145* (2013.01)

(56) References Cited

U.S. PATENT DOCUMENTS

| | | | |
|---|---|---|---|
| 9,567,102 B1* | 2/2017 | Ross | B64D 45/00 |
| 9,767,625 B1* | 9/2017 | Snyder | B60R 21/0132 |
| 9,932,033 B2* | 4/2018 | Slusar | B60W 50/082 |
| 10,102,586 B1* | 10/2018 | Marlow | G06Q 40/08 |
| 10,145,684 B1* | 12/2018 | Tofte | B64D 47/08 |
| 2004/0015336 A1* | 1/2004 | Kulesz | G08B 21/12 |
| | | | 703/11 |
| 2009/0205845 A1* | 8/2009 | Hoffman | A62C 3/025 |
| | | | 169/43 |
| 2010/0194558 A1* | 8/2010 | Toh | G08G 1/205 |
| | | | 340/539.1 |
| 2010/0194592 A1* | 8/2010 | Yim | G08G 1/096741 |
| | | | 340/905 |
| 2012/0284755 A1* | 11/2012 | Keret | H04N 21/2187 |
| | | | 725/62 |
| 2014/0365246 A1* | 12/2014 | Hayward | G06Q 40/08 |
| | | | 705/4 |
| 2015/0054639 A1 | 2/2015 | Rosen | |
| 2015/0097703 A1* | 4/2015 | Baur | G08G 1/09626 |
| | | | 340/902 |
| 2015/0172894 A1* | 6/2015 | Gabel | H04W 4/16 |
| | | | 455/404.2 |
| 2015/0179062 A1* | 6/2015 | Ralston | G08G 1/0145 |
| | | | 701/117 |
| 2015/0338235 A1* | 11/2015 | Schmidt | G01C 21/3694 |
| | | | 701/532 |
| 2016/0063642 A1* | 3/2016 | Luciani | G06Q 40/08 |
| | | | 705/4 |
| 2016/0093212 A1* | 3/2016 | Barfield, Jr. | H04N 7/185 |
| | | | 348/144 |
| 2016/0180144 A1* | 6/2016 | Tatourian | G06K 9/0063 |
| | | | 382/104 |
| 2016/0189303 A1* | 6/2016 | Fuchs | G06Q 40/08 |
| | | | 705/4 |
| 2016/0236638 A1* | 8/2016 | Lavie | G06K 9/00771 |
| 2016/0272317 A1* | 9/2016 | Cho | G08G 1/162 |
| 2016/0358081 A1* | 12/2016 | Cama | G08G 1/0112 |
| 2016/0364986 A1* | 12/2016 | Kwak | G08B 25/00 |
| 2017/0004714 A1* | 1/2017 | Rhee | G08G 5/0086 |
| 2017/0011465 A1* | 1/2017 | Anastassov | G06Q 40/08 |
| 2017/0024671 A1* | 1/2017 | McCormack | B64C 39/024 |
| 2017/0046216 A1* | 2/2017 | Stenneth | G01P 15/00 |
| 2017/0103659 A1* | 4/2017 | Jin | G05D 1/101 |
| 2017/0210451 A1* | 7/2017 | Oh | B63C 9/22 |
| 2018/0203465 A1* | 7/2018 | Suzuki | B64C 39/02 |
| 2018/0365983 A1* | 12/2018 | Karapantelakis | G07C 5/085 |

OTHER PUBLICATIONS

International Search Report as issued in International Patent Application No. PCT/EP2016/081727, dated Mar. 8, 2017.

* cited by examiner

PROCESS FOR SIGNALING AN ACCIDENT BY MEANS OF A SIGNALING DRONE

CROSS-REFERENCE TO RELATED APPLICATIONS

This application is the U.S. National Stage of PCT/EP2016/081727, filed Dec. 19, 2016, which in turn claims priority to French patent application number 1563131 filed Dec. 22, 2015. The content of these applications are incorporated herein by reference in their entireties.

TECHNICAL FIELD OF THE INVENTION

The invention relates to the general field of road safety. The invention more particularly pertains to a process for signaling a road accident by a signaling drone. The process according to the invention makes it possible to avoid further accident complications and thus it makes it possible to provide assistance to victims in complete safety. Moreover, the invention concerns a signaling drone implementing said process.

TECHNOLOGICAL BACKGROUND OF THE INVENTION

Faced with a road accident, the role of the witness or person intervening is fundamental. Indeed, having arrived at the place of the accident, the witness has to ensure the protection of the place of the accident in order to avoid further accident complications and thus to ensure the protection of the victims and the emergency services.

To do so, on approaching the place of the accident, the witness must, first of all, switch on his warning lights and slow down progressively while checking that no other vehicle arrives at high speed. He must next park his vehicle after the place the accident, ideally on the hard shoulder. Next, the witness has to wear a reflective garment in order to be visible by other vehicles.

The witness must, thereafter, ensure the marking of the place of the accident. The marking of the place of the accident delimits the area of intervention of the witness or witnesses and/or emergency services and constitutes a physical protective barrier for the victim and/or the witnesses and/or the emergency services. Marking elements having fluorescence and retro-reflection characteristics must then be positioned at a regulatory distance from the place of the accident. In this way, drivers are warned of the obstacle sufficiently in advance to slow down and/or to stop if necessary and to take another lane for example.

However, ensuring the marking of the place of the accident slows down the witness in taking charge of the victims, the lives of whom are in danger.

GENERAL DESCRIPTION OF THE INVENTION

In this context, the invention aims to overcome all or part of the drawbacks of the prior art identified above, notably by proposing a solution making it possible to ensure automatically the marking of the place of the accident such that the first witness can provide assistance to the victims as soon as he arrives at the place of the accident.

Thus, according to a first aspect, the invention relates to a process for signaling an accident by means of at least one drone, said process comprising the following steps:
acquiring a location of the place of the accident,
calculating a coordinate of at least one signaling position,
signaling the accident in accordance with a combination of the location of the place of the accident and the calculated coordinate of said at least one signaling position.

The process according to the first aspect of the invention makes it possible to resolve the aforesaid problems.

Indeed, as soon as the place of the accident has been located, the drone automatically calculates a coordinate of at least one signaling position which takes into account the data relative to the place of the accident. Indeed, the location of the place of the accident enables, for example, the drone to determine the applicable regulations in the place of the accident notably the distance at which the signaling of the accident to other vehicles has to be made. An operator arriving at the place of the accident does not necessarily know the regulations in force concerning the safety distance to comply with in the geographic area where he finds himself.

Once the coordinate of the signaling position has been calculated, the drone positions itself automatically according to said signaling position in order to signal to other vehicles that an accident has occurred and thus that they have to slow down and take another lane. The signaling of the accident to other vehicles makes it possible to avoid further accident complications and thus to ensure the safety of the operator, that of the victims, the emergency services and drivers taking the same lane.

Thus, while the drone carries out the marking of the place of the accident, the operator can provide assistance to the victims of the accident without losing time.

The process according to the first aspect of the invention may also have one or more of the characteristics below, considered individually or according to all technically possible combinations thereof.

According to one non-limiting embodiment, the signaling of the accident is carried out by the deployment of at least one marking element.

According to one non-limiting embodiment, the signaling of the accident is carried out by a light and/or sound signal emitted by said at least one drone.

According to one non-limiting embodiment, the location of the place of the accident comprises a reception of location data via a terminal which transmits said location data to said drone.

According to one non-limiting embodiment, the acquisition of the location of the place of the accident comprises a location of the emplacement in which an operator has positioned the drone, said emplacement being assimilated with the place of the accident via the activation of an actuator of said drone.

According to one non-limiting embodiment, the acquisition of the location of the place of the accident comprises a recognition of the place of the accident by image analysis means of the drone.

According to one non-limiting embodiment, the process comprises a road mapping of the geographic area in which the accident has occurred.

According to one non-limiting embodiment, the road mapping comprises topographic data.

According to one non-limiting embodiment, the road mapping data are associated with regulatory data.

According to one non-limiting embodiment, the calculation of the coordinate of the signaling position is carried out according to the data relating to the geographic area of the accident.

Moreover, according to a second aspect, the invention relates to a signaling drone implementing the steps of the process according to the first aspect of the invention.

Finally, according to a third aspect, the invention relates to a recording support that can be read by computer on which is recorded a computer program including program code instructions for the execution of the steps of the process according to the first aspect of the invention.

BRIEF DESCRIPTION OF THE FIGURES

Other characteristics and advantages of the invention will become clear from reading the description that follows, with reference to the appended figures, which illustrate.

The invention and its different applications will be better understood on reading the description that follows and by examining the figures that accompany it. These are presented as non-limiting examples of the invention.

DETAILED DESCRIPTION OF AT LEAST ONE EMBODIMENT OF THE INVENTION

Unless stated otherwise, a same element appearing in the different figures has a single reference.

The invention relates to a process PRC for signaling an accident by means of at least one signaling drone 4. "Drone" is taken to mean a pilotless flying device capable of transporting one or several load(s) and depositing said loads at a given place. The size and the weight of such drones are chosen according to the desired operational capacities. Within the scope of the invention, for example, the weight of the drone 4 is of the order of 8.5 kg and the drone 4 has the following dimensions: 115×115×70 cm (width×length×height).

Figure 1:
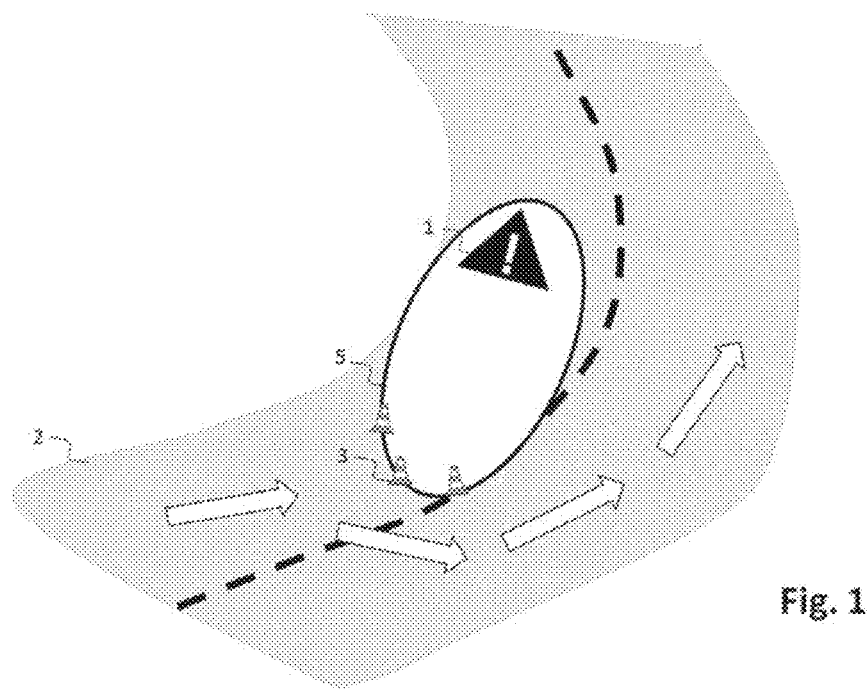
in FIG. 1, an example of marking of the place of an accident according to one embodiment of the invention, in FIG. 2, an infrastructure enabling the implementation of the invention according to one embodiment, in FIG. 3, the steps of the process for signaling according to one embodiment of the invention.

FIG. 1 represents an example of marking of the place of an accident on a one-way road.

With reference to FIG. 1, the place 1 of the accident that has occurred on a road 2 has been marked, according to one embodiment. The marking has been carried out by the positioning of marking elements 3, here cones, at calculated signaling positions. Thanks to such marking, drivers taking the same road as that where the accident has occurred are warned sufficiently in advance of the place 1 of the accident in order to slow down correctly and thus to skirt round the accident area 5 according to the represented arrows. "Accident area" is taken to mean an area including the place 1 of the accident and which is delimited by the signaling positions.

Figure 2:
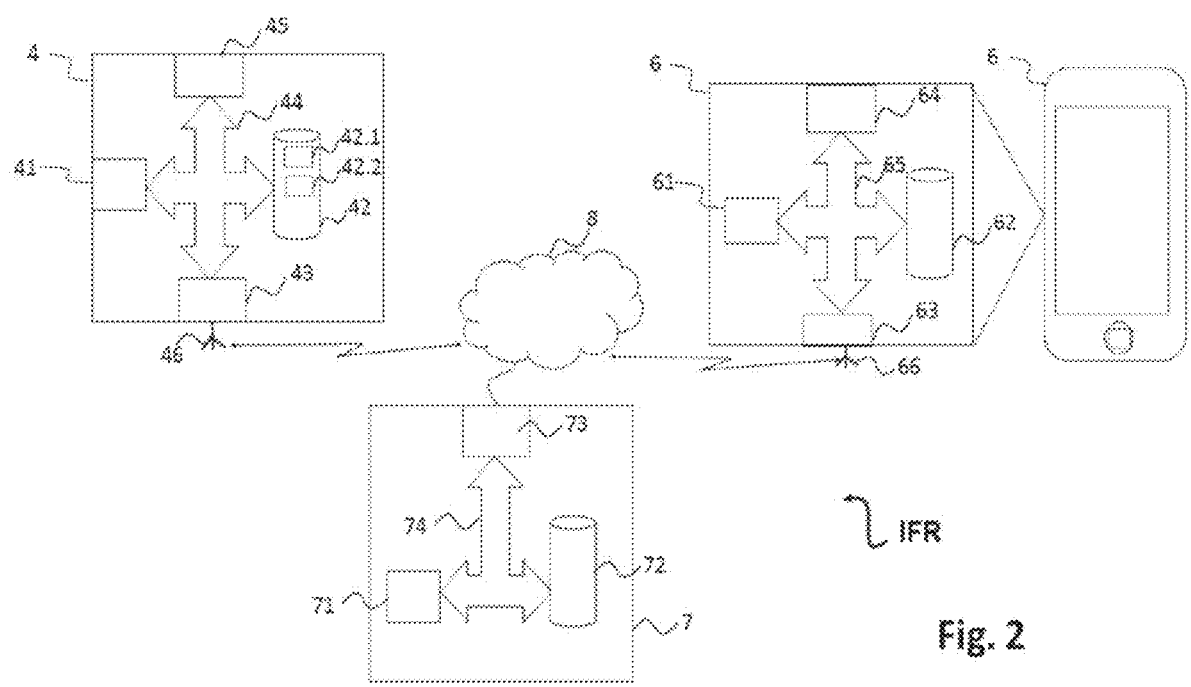

The signaling of the place 1 of the accident is implemented by an infrastructure IFR represented in FIG. 2.

The marking of the place 1 of the accident is carried out by at least one signaling drone 4. With reference to FIG. 2, the signaling drone 4 of the infrastructure IFR comprises:
  a microprocessor 41,
  storage means 42,
  a communication interface 43, for example a wireless communication card,
  a geolocation system 45.

The microprocessor 41 of the drone 4, the storage means 42 of the drone 4, the communication interface 43 of the drone 4 and the geolocation system 45 of the drone 4 are interconnected by a bus 44.

It should be noted that "storage means" is taken to mean for example, a hard disk, an SD card, a micro-Sim, etc.

Moreover, with reference to FIG. 2, the storage means 42 of the drone 4 comprise:
  a first area 42.1 storing road mapping data,
  a second area 42.2 storing instruction codes for the implementation of the process PRC according to the invention.

It should be noted that "wireless communication interface" is taken to mean, for example, a Wifi interface, a Zigbee interface, etc. Moreover, it should be noted that the communication interface 43 uses an antenna 46 of the drone 4 to receive or transmit data by radio waves.

It should also be noted that "geolocation system" is taken to mean a GPS, a Galileo system, etc.

It will be recalled that when an action is ascribed to a device, said action is in fact carried out by a microprocessor of the device commanded by instruction codes recorded in storage means of the device. In addition, if an action is ascribed to an application, said action is in fact carried out by a microprocessor of the device in a memory of which the instruction codes corresponding to the application are recorded. When a device or an application emits a message, said message is emitted via a communication interface of said device or of said application.

According to another embodiment, the infrastructure IFR comprises at least two signaling drones 4.

Moreover, according to one embodiment, at least one operator, for example a witness of the accident, communicates with said drone 4 by means of an application executed via his terminal 6.

The terminal 6 of the infrastructure IFR, whether it is a computer, a cellphone, a tablet or a connected object, comprises:
  a microprocessor 61,
  storage means 62,
  a communication interface 63, for example a wireless communication card,
  a screen 64.

The microprocessor 61 of the terminal 6, the storage means 62 of the terminal 6, the communication interface 63 of the terminal 6 and the screen 64 of the terminal 6 are interconnected by a bus 65.

Moreover, it should be noted that the communication interface 63 uses an antenna 66 of the drone 4 to receive or transmit data by radio waves.

Furthermore, according to one embodiment, the operator communicates via his terminal 6 with at least one remote server 7. According to another embodiment, the signaling drone 4 communicates with at least one remote server 7. According to another embodiment, the signaling drone 4 and the terminal 6 communicate with at least one remote server 7.

With reference to FIG. 2, the remote server 7 of the infrastructure IFR, comprises:
  a microprocessor 71,
  storage means 72,
  a communication interface 73.

The microprocessor 71 of the remote server 7, the storage means 72 of the remote server 7 and the communication interface 73 of the remote server 7 are interconnected by a bus 74.

According to one embodiment, the signaling drone 4, the terminal 6 and the remote server 7 are interconnected by a network 8, for example the Internet network. This is only an example, another frequent case is that the communication interface 43 of the signaling drone 4 communicates directly with the communication interface 66 of the terminal 6 which for its part communicates with the communication interface 73 of the remote server 7.

Figure 3:
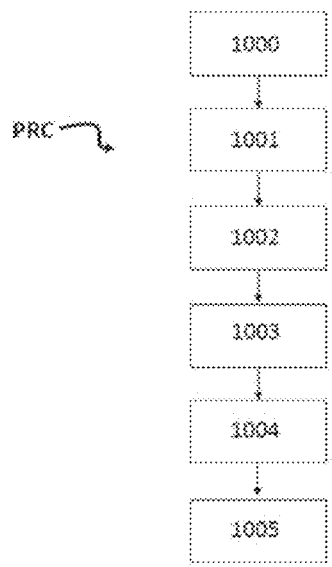

FIG. 3 represents the steps of the process PRC for signaling according to one embodiment of the invention.

According to a preliminary step 1000, the signaling drone 4 is configured according to data relating to the geographic area of the accident. "Data relating to the geographic area of the accident" is taken to mean a recovery of information relating to the geographic area (country, town, etc.) in which said drone 4 finds itself either in the vicinity, or near to or at the place 1 of the accident. According to one embodiment, the drone 4 is, beforehand, unlocked by the operator by means of a locking/unlocking button of the drone 4.

The geographic area in which the signaling drone 4 is found is determined:
- according to a first embodiment, by the geolocation system 45 of the drone 4,
- according to a second embodiment, by the terminal 6 which, by means of a geolocation system of the terminal 6 transmits to the drone 4 the geographic area in which it finds itself,
- according to a third embodiment, following a selection of said geographic area by the operator via his terminal 6 which is next transmitted to the drone 4.

Once the geographic area has been determined, the drone 4 recovers the information relating to the geographic area via:
- according to a first embodiment, the drone 4 which comprises said information in the storage means 42 of said drone 4,
- according to a second embodiment, the terminal 6 which comprises said information in the storage means 62 of said terminal 6.
- according to a third embodiment, the remote server 7 which comprises said information in the storage means 72 of said server 7.

According to one embodiment, the data relating to the geographic area are regulatory data specific to the geographic area in which the accident has occurred. "Regulatory data" is taken to mean, for example, regulatory signaling distances which can vary according to the country and according to the type of road (normal road, highway etc.). In France, for example, a marking element must be placed at least 30 meters from the obstacle such that a driver can catch sight of the marking element at 100 meters. Moreover, the signaling distance can vary according to the type of road. For example, in Belgium, for ordinary roads, the marking element must be positioned at 30 meters, whereas on a highway said element has to be placed 100 meters from the place of the accident.

Moreover, according to another embodiment, the data relating to the geographic area are a road mapping of said geographic area in which the drone 6 finds itself. "Road mapping" is taken to mean a schematic representation of the road axes in digital form.

According to another embodiment, the data relating to the geographic area are description data of the topography of said geographic area in which the drone 6 finds itself. "Topography" of the geographic area is taken to mean markings on the ground (continuous line, dissuasion line, warning line, guiding line, etc.), the type of road covering (bituminous concrete, cement concrete, cobblestones, surface dressings, etc.), safety barriers, the roadway, etc.

The triggering of the configuration of the signaling drone 4 according to the preliminary step 1000 is:
- according to a first embodiment, carried out by the operator via the application executed on his terminal 6,
- according to a second embodiment, is automatically carried out by the signaling drone 4 as soon as it is switched on.

An automatic configuration of the drone 4 makes it possible to update automatically information relating to the geographic area which are stored in the storage means 42 of the drone 4.

The preliminary step 1000 of configuration of the signaling drone 4 enables said drone 4 to be already operational when it arrives at the scene of the accident. The recovery of information relating to the geographic area may be carried out as soon as the place 1 of the accident is known, even before the drone 4 has arrived at the scene.

According to a first step 1001, an acquisition of a location of the place 1 of the accident is carried out by the drone 4. "Acquisition of a location" is taken to mean the coordinates of a point associated with the place 1 of the accident or a plurality of coordinates associated with several points forming an area associated with the place 1 of the accident.

The acquisition of the location of the place 1 of the accident comprises, according to one embodiment, a location of the emplacement in which the operator has positioned the drone 4, said emplacement being assimilated with the place of the accident via the activation of an actuator of said drone 4. Thus, when the drone 4 is positioned by the operator on the road for example, near to the place 1 of the accident, the drone 4 records said emplacement as corresponding to the place 1 of the accident. According to one embodiment, the location of the emplacement in which the operator has positioned the drone 4 is carried out by means of the geolocation system 45 of said drone 4. The actuator thus makes it possible either to define a zero making it possible to define a relative position updated via accelerometers or to read a value of the geolocation system 45 to determine an absolute departure point therefrom.

According to another embodiment, the acquisition of the location of the place 1 of the accident comprises a reception of location data transmitted by the terminal 6 to the drone 4. "Location data" is taken to mean one or more coordinates associated with the place of the accident. Indeed, according to one embodiment, the operator selects, via a dedicated application executed on his terminal 6, the place 1 of the accident which is then transmitted to the drone 4 in the form of location data.

According to another embodiment, the location of the place 1 of the accident comprises a recognition of the place 1 of the accident by image analysis means of the drone 4. The image analysis means comprise, according to one embodiment, image capture means, for example a camera (visible, IR spectra). The image analysis means thus comprise the microprocessor 41 of the drone 4 and instruction codes recorded in the second area 42.1 of the storage means 42 of the drone 4. According to one embodiment, the image capture means capture images in which appear, for example, moving and motionless elements (debris, vehicles, local residents, etc.). According to another embodiment, said image capture means capture images in which appear, for example, various elements constituting the traffic lane (roadway, shoulder, markings on the ground, safety barriers, etc.). The captured images are next analyzed, according to one embodiment, by performing a shape recognition. "Shape recognition" (or sometimes pattern recognition) is taken to mean a series of techniques and methods aiming to identify information patterns from raw data in order to take a decision dependent on a category attributed to said pattern.

For example, the contours of a stopped vehicle, a person on the ground will be recognized by the image analysis means of the drone 4 as being the vehicle and the body of the victim. The same is true when it involves recognizing characteristics of the road such as ground markings, a roadway, a shoulder or instead safety barriers, the contours of said elements being correlated with pre-recorded contours. According to one embodiment, the contours of elements associated with categories are contained in the storage means 42 of the drone 4. According to another embodiment, said contours associated with categories are contained in the storage means 72 of the remote server 7 and/or in the storage means 62 of the terminal 6 which are next transmitted to the drone 4. In an alternative embodiment, the captures of images carried out by the drone 4 are transmitted so that the processing is carried out remotely by the terminal 6 or the remote server 7. The drone 4 thus receives the results of the processing for shape recognition without having to do it itself.

It should be noted that, in an alternative, the preliminary step 1000 of configuration of the drone 4 is carried out after the first step 1001 of acquisition of the location of the place of the accident.

According to a second step 1002, a coordinate of at least one signaling position is calculated. The coordinate associated with at least one signaling position is calculated according to the coordinates of the place 1 of the accident determined during the first step 1001 of acquisition of the location of the place 1 of the accident.

According to one embodiment, the calculation of the coordinate of at least one signaling position takes into account at least one data of the data relating to the geographic area of the accident determined in the preliminary step 1000 of configuration of the drone 4. Indeed, it will be recalled that according to notably the type of road, the regulations, the topography of the road, the coordinates of the position(s) at which the signaling is carried out varies. For example, the signaling of the place of the accident on a highway must be carried out at a distance from the place of the accident greater than the distance at which the signaling has to be carried out on an ordinary road.

In an exemplary embodiment, the position $P_s$ at which the signaling of the place 1 of the accident has to be done corresponds to the intersection between the road on which the accident has occurred and the circle of which the center corresponds to the place 1 of the accident and of which the radius corresponds to the regulatory distance ds between the place 1 of the accident and the marking for the type of road concerned.

According to one embodiment, the second step 1002 comprises the calculation of coordinates associated with at least two positions $P_s$ at which the signaling has to be carried out.

According to a third step 1003, a signaling of the accident is carried out.

According to one embodiment, the signaling of the accident is carried out upstream of the place 1 of the accident according to the direction of the road. According to another embodiment, the signaling is also carried out downstream of the accident, in particular when the road is a two-way road. Moreover, according to one embodiment, the signaling of the accident is carried out on several one-way roads or on several two-way roads.

The signaling of the accident is carried out by a combination of the location of the place 1 of the accident determined in the first step 1001 and the coordinates of the signaling position calculated in the second step 1002.

According to one embodiment, the signaling of the accident is carried out by the deployment of at least one marking element. "Marking element" is taken to means elements having fluorescence and retro-reflection characteristics. According to one embodiment, the marking element 3 is a pre-signaling triangle. According to another embodiment, the marking element 3 is a cone. In said embodiment, the drone 4 transports at least one marking element 3 from a starting point (trunk of an intervention vehicle, road) to at least one signaling position by means of a marker-carrier of the drone 4. In another embodiment, the marking element 3 is carried on board the drone 4, said marking element 3 being removed and deposited when the drone 4 arrives at the level of the signaling position. According to one embodiment, the signaling of the accident is carried out by a light and/or sound signal emitted by said at least one drone 4. The emission of a light and/or sound signal makes it possible to reduce the delay in the taking into account of the accident by drivers approaching the place 1 of the accident. According to one embodiment, when the signaling is carried out by the emission of a light signal, the drone 4 hovers at the level of the signaling position sufficiently high to be visible to approaching vehicles. According to one embodiment, the light signal is emitted in the form of a message visible on a screen of the drone 4. According to one embodiment, the light signal is emitted by at least one light emitting diode (LED) of the drone 4.

According to a fourth step 1004, the location of the place 1 of the accident is transmitted to the emergency services and/or to the constabulary/police.

According to one embodiment, the transmission of the location of the place 1 of the accident to the emergency services and/or to the constabulary/police is carried out automatically by the drone 7. According to another embodiment, the transmission of the location of the place 1 of the accident to the emergency services and/or to the constabulary/police is carried out by the terminal 2. It should be noted that in one embodiment, the location data of the place 1 of the accident transmitted to the emergency services correspond to the location data of the place 1 of the accident acquired during the first step 1001.

According to one embodiment, the transmission of the location 1 of the accident to the emergency services and/or to the constabulary/police is accompanied by information relating to the physical state of the victim or victims.

It should be noted that according to one embodiment, the fourth step 1004 of transmission of the location of the place 1 of the accident to the emergency services is carried out following the first step 1001 of acquiring the location of the place 1 of the accident or more generally as soon as the required information is known.

According to a fifth step 1005, the signaling of the place 1 of the accident by the drone 4 is stopped.

Indeed, when the drone 4 is no longer useful, said drone 4 recovers, according to one embodiment, the marking element(s) 3 and repositions itself near to the operator. In another embodiment, the drone 4 repositions itself at the initial emplacement where it had been positioned by the operator before the signaling. According to one embodiment, the drone 4 is next locked by the operator via the locking/unlocking button of the drone 4.

The process PRC according to the invention thus makes it possible to carry out an automatic and precise marking of the place 1 of an accident which allows a witness to provide assistance to the victims as soon as he arrives at said place

The invention claimed is:

1. A process for signaling an accident by means of at least one drone, said at least one drone being an unmanned aerial vehicle, said process comprising:
   acquiring, by said drone, a location of a place of the accident,
   calculating, by said drone, coordinates of at least one signaling position, the coordinates of the at least one signaling position being calculated based on a combination of the location of the place of the accident and information related to the geographic area of the location of the place of the accident, the information related to the geographic area of the location of the place of the accident including at least one of (i) a regulatory data specific to the geographic area in which the accident has occurred, (ii) a road mapping of the geographic area, and (iii) topography data of the geographic area,
   positioning said drone at said at least one signaling position, the coordinates of said at least one signaling position being different from coordinates of the place of the accident,
   after said positioning, signaling, by said drone at said at least one signaling position, the accident to a vehicle approaching the place of the accident.

2. The process for signaling according to claim 1, wherein the signaling of the accident is carried out by a deployment of at least one marking element.

3. The process for signaling according to claim 1, wherein the signaling of the accident is carried out by a light and/or sound signal emitted by said at least one drone.

4. The process for signaling according to claim 1, wherein the acquisition of the location of the place of the accident comprises a reception of location data via a terminal which transmits said location data to said drone.

5. The process for signaling according to claim 1, wherein the acquisition of the location of the place of the accident comprises a location of an emplacement in which an operator has positioned the drone, said emplacement being assimilated with the place of the accident via an activation of an actuator of said drone.

6. The process for signaling according to claim 1, wherein the acquisition of the location of the place of the accident comprises recognition of the place of the accident by image analysis means of the drone.

7. The process for signaling according to claim 1, wherein the information related to the geographic area includes the road mapping.

8. The process for signaling according to claim 1, wherein the information related to the geographic area includes the topographic data.

9. A signaling drone comprising hardware components implementing the process according to claim 1.

10. A non-transitory computer readable medium comprising program code instructions for the execution, by a signaling drone, of the steps of the process according to claim 1.

* * * * *